US 008370456B2

(12) United States Patent
Ganapathy et al.

(10) Patent No.: US 8,370,456 B2
(45) Date of Patent: Feb. 5, 2013

(54) INTELLIGENT PRE-FETCHING USING COMPOUND OPERATIONS

(75) Inventors: Ramanathan Ganapathy, Redmond, WA (US); Jeffrey C. Fuller, Redmond, WA (US); Mathew George, Bellevue, WA (US); David Kruse, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1159 days.

(21) Appl. No.: 11/534,446

(22) Filed: Sep. 22, 2006

(65) Prior Publication Data

US 2008/0077655 A1    Mar. 27, 2008

(51) Int. Cl.
    *G06F 15/16*    (2006.01)
(52) U.S. Cl. .................... 709/219; 709/203; 709/205
(58) Field of Classification Search .......... 709/201–203, 709/230–237
    See application file for complete search history.

(56) References Cited

U.S. PATENT DOCUMENTS

| 6,154,767 | A * | 11/2000 | Altschuler et al. ............ 709/203 |
| 6,434,553 | B1 | 8/2002 | Sekiguchi et al. |
| 6,526,439 | B1 | 2/2003 | Rossmann et al. |
| 6,687,764 | B2 | 2/2004 | Sonoda et al. |
| 6,691,151 | B1 | 2/2004 | Cheyer et al. |
| 6,718,327 | B1 | 4/2004 | Edmonds |
| 6,859,931 | B1 | 2/2005 | Cheyer et al. |
| 6,910,082 | B1 | 6/2005 | Marcotte |
| 6,922,708 | B1 | 7/2005 | Sedlar |
| 2002/0091763 | A1 | 7/2002 | Shah et al. |
| 2003/0004933 | A1 | 1/2003 | Ben-Yehezkel |
| 2003/0126232 | A1 | 7/2003 | Mogul et al. |
| 2005/0005027 | A1 * | 1/2005 | Drouet et al. ................. 709/245 |
| 2005/0091187 | A1 | 4/2005 | Madhavarapu et al. |
| 2005/0138091 | A1 | 6/2005 | Bono |
| 2006/0117018 | A1 | 6/2006 | Christiansen et al. |

FOREIGN PATENT DOCUMENTS

EP    0938052    6/1999

OTHER PUBLICATIONS (Performance Modelling of Speculative Prefetching for Compound Requests in Low Bandwidth Networks; N.J. Tuah, M.J. Kumar, S. Venkatesh; Curtin University of Technology; ACM Copyright 2000).*
(Compound Operations Proposal; Callaghan, Brent; Mar. 13, 1997; nfsv4@ietf.org; http://www.nfsv4.org/nfsv4-wg-archive-dec-96-jan-03/0062.html).*
White et al., "An Interposition Agent for the Legion File System", Jan. 22, 2002, http://www.cs.cornell.edu/~bwhite/papers/masters.pdf.

(Continued)

*Primary Examiner* — Ian N Moore
*Assistant Examiner* — Afshawn Towfighi
(74) *Attorney, Agent, or Firm* — Wolfe-SBMC

(57) ABSTRACT

A system and method for pre-fetching data uses a combination of heuristics to determine likely next data retrieval operations and an evaluation of available resources for executing speculative data operations. When local resources, such as cache memory for storing speculative command results is not available, the compound operation request may not be sent. When resources on a server-side system are insufficient, only the primary command of a compound operation request may be processed and speculative command requests may be rejected. Both local computing resources and network resources may be evaluated when determining whether to build or process a compound operations request.

20 Claims, 6 Drawing Sheets

OTHER PUBLICATIONS

Nimmagadda et al., "High-End Workstation Compute Farms Using Windows NT", Intel Corporation, 1999, http://www.usenix.org/events/usenix-nt99/full_papers/nimmagadda/nimmagadda_html/index.html.

Sridharan, M., "Comparison of Network Operating Systems", 2001, http://www.cse.ohio-state.edu/~sridhara/papers/741a.pdf.
International Search Report for PCT/US2007/077291 mailed Jan. 11, 2008.
Written Opinion for PCT/US2007/077291 mailed Jan. 11, 2008.

* cited by examiner

INTELLIGENT PRE-FETCHING USING COMPOUND OPERATIONS

BACKGROUND

Processes that are communicatively connected, for example, client-server applications, are highly dependent on network speed and latency to provide responsiveness in application execution. Even the fastest computers may seem slow when the data required for processing is not readily available. These delays may be due to several factors, including congestion at the server and delays on the connections between the requesting and the providing processes. Server message block (SMB) 1.0 used a form of compounding of requests when communicating with servers using an older dialect of the protocol. Neither client nor server side processes selectively used compounding or data pre-fetching to address network latency.

SUMMARY

An intelligent remote request processing system incorporates intelligence at both the requesting end and the receiving end to address network latency by compounding requests to speculatively retrieve not only requested data but also data likely to be retrieved subsequently. The requesting process may determine likely follow-on data requests for incorporation into the remote data request. The requesting end and the receiving end may each, separately, ignore pre-fetch command processing when local resources do not support the additional demands on system associated with pre-fetching data. Other considerations, such as available network bandwidth may also be incorporated into a decision to compound requests. Additional intelligence at the server end allows results from a first command to be used when building a subsequent data request command.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
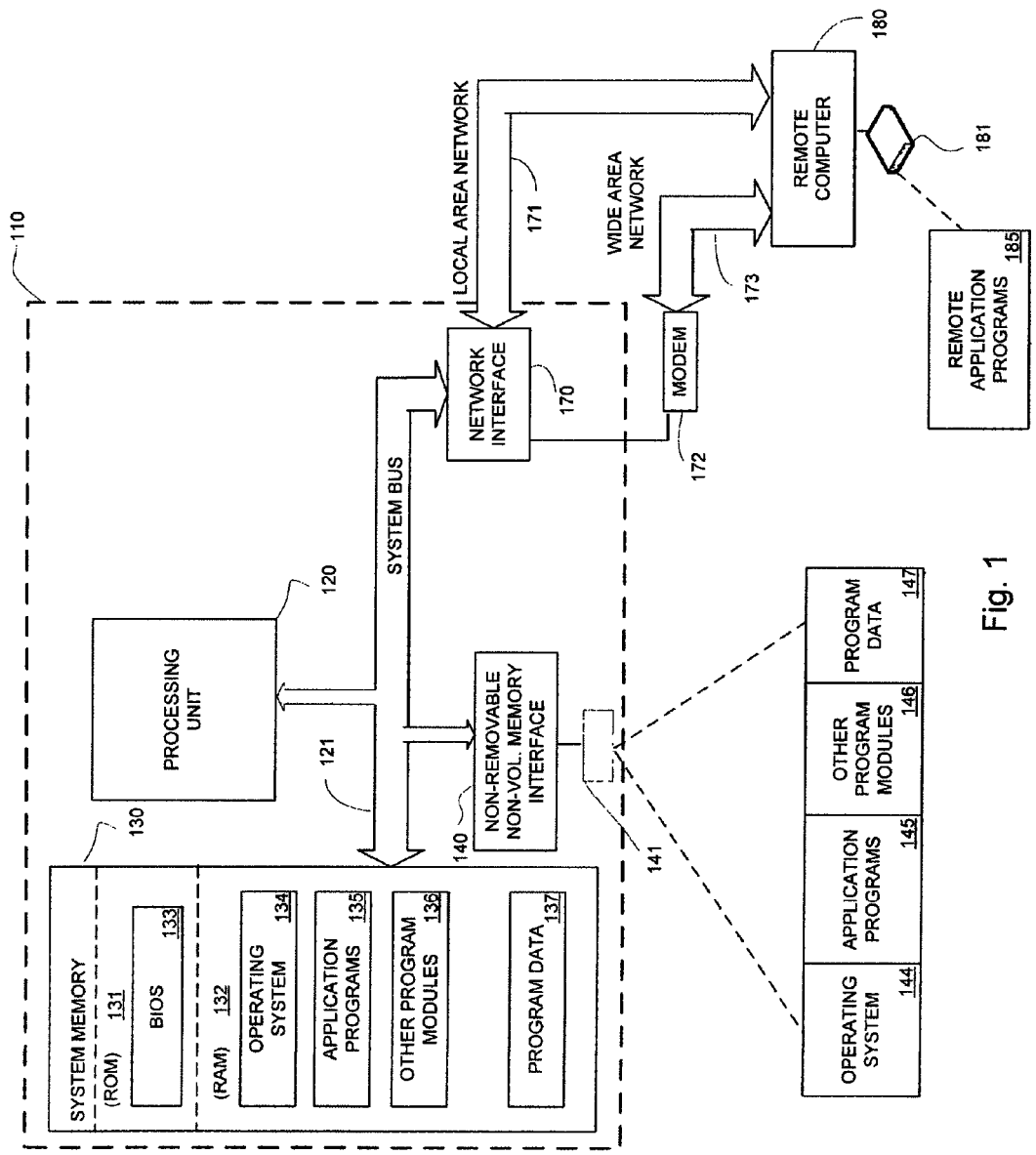
FIG. 1 is a block diagram of a computer suitable for hosting selective pre-fetching using compound operations.

FIG. 1 illustrates a computing device in the form of a computer 110 that may host one or more of the embodiments of the current disclosure and is discussed in detail to provide a context for subsequent discussions.

Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, radio frequency, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 141.

The drive and its associated computer storage media discussed above and illustrated in FIG. 1, and similar removable and non-removable storage (not depicted) provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 172, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
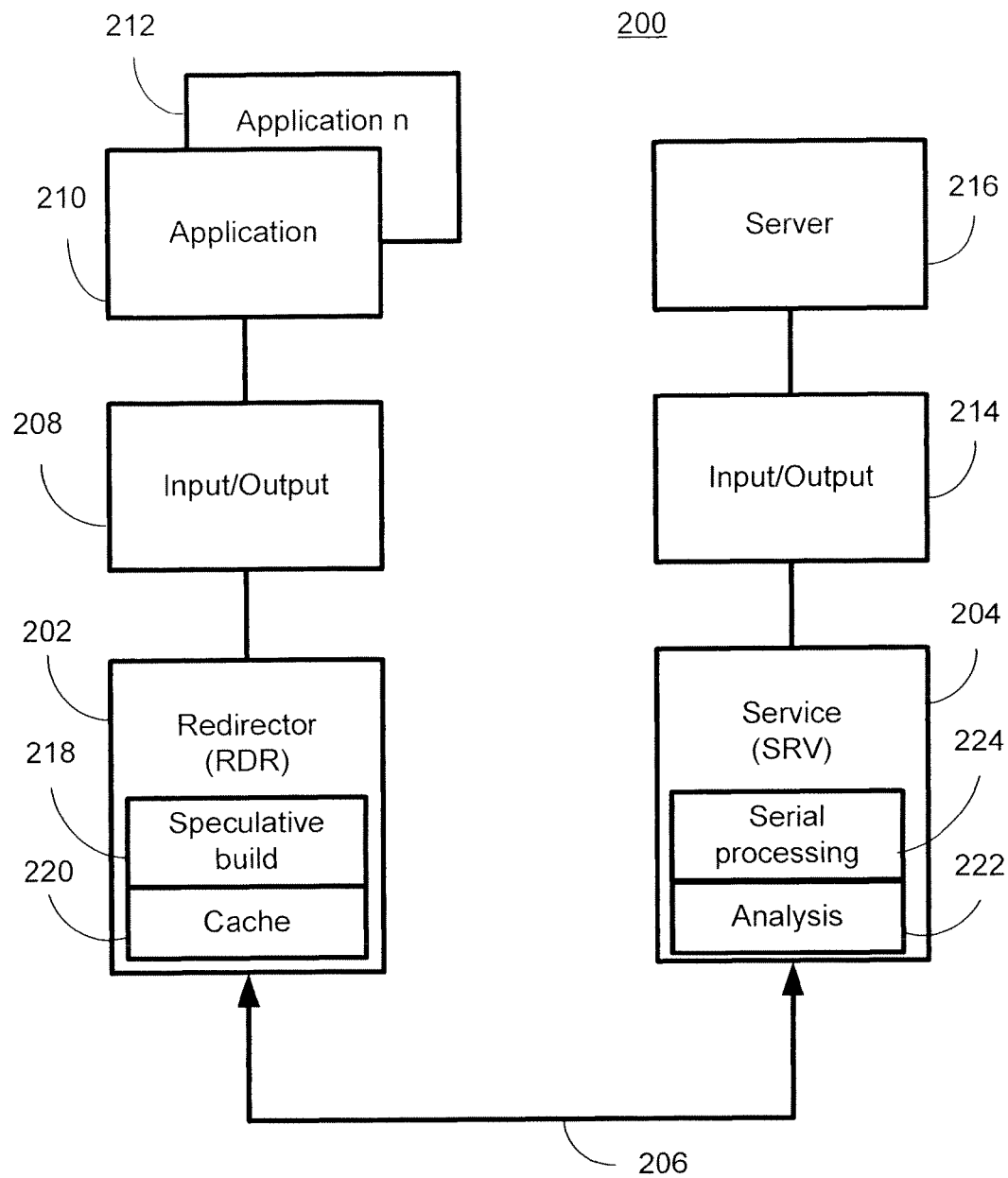
FIG. 2 is a block diagram showing logical connections supporting selective pre-fetching.

FIG. 2 illustrates a block diagram of connected processes providing a suitable environment for selective pre-fetching. The application 210 and server 216 may be on the same physical computer or may be on separate computers, as illustrated in FIG. 1 by computer 110 and remote computer 180. An application-side low-level process, such as redirector 202 may be coupled to a server-side low-level process, such as service process 204 via a communication channel 206. The communication channel 206 may range from a local pipe, to a local-area network, to a wide-area network, depending on the location of the separate low level processes 202 204 and the availability of networks.

Above the redirector 202 may be an input/output function (I/O) 208 that offers connectivity abstractions to one or more applications 210 212. Above the service 204 may be a corresponding input/output (I/O) function 214 offering connectivity abstractions to a server process 216. The I/O function may not directly correspond to the I/O function 208. For example, in one embodiment, the client I/O function 208 is in the user mode where the server I/O function 214 is in the kernel mode and communicates directly with the network stack. The redirector 202 and corresponding service process 204 may perform functions low in the ISO seven-layer stack, such as physical network addressing, etc. The respective input/output functions 208 and 214 may perform functions associated with higher layers in the ISO stack such as logical name abstractions and functional abstractions such as building packets from a 'send' call made by the application 210 or server 216 or deconstructing a received packet and forwarding return data to the application 210 or the server 216.

The application 210 may be any process that sends data to or receives data from the server 216. Examples of application processes include, but are not limited to, data processing, database maintenance, information search, records management, etc. The server 216 may include files, database records, data structures and the like under the control of a database application or other data manager (not depicted).

The redirector 202, in some applications known as a RDR, may have additional functions associated with speculative pre-fetching. A speculative build function 218 may include the logic necessary to evaluate a request for execution of a command at a remote system and to select one or more commands that complement the request. For example, a file-open for read permissions may be coupled with file read attributes and file read commands to build a compound command. In one embodiment, the file read attributes and read commands may be marked as speculative, giving the service process 204 the opportunity to deny execution, as discussed more below. The file read attributes and read commands may be considered speculative because the requesting application 210 may not follow up the file open command with any other requests, and any data retrieved in association with the file-read attributes and read commands would be unused. When the service process 204 returns results associated with one or more speculative requests, the results may be stored in the cache 220. If insufficient cache memory is available to store speculative results, there is no point in forwarding the speculative command or commands. Therefore, part of the speculative build function 218 may include an evaluation of local resources in light of the likely returned results before determining whether to continue with the speculative build process. For example, a file-read attributes may only return the attributes of the file, a relatively small result. Conversely, a file read command may return substantial data. If cache 220 is low, a speculative command for a file-read attributes may be included but a speculative file read command may not be included.

The service process 204, in one embodiment referred to as an SRV, may also have additional functions associated with speculative pre-fetching. The analysis function 222 may support command analysis and resource checking of incoming requests. The analysis function 222 may deconstruct a compound request into individual commands and then determine if one or more are marked as speculative. If a speculative command is found, the analysis process 222 may evaluate resources in the service process 204, as well as higher level processes, to determine whether execution of the speculative processes can be supported without incurring unacceptable processing delays to either the current process or other processes. For example, if queue times are borderline, or if memory for storing intermediate results is unavailable, the analysis process 222 may simply refuse to process the speculative commands and return a message indicating a the speculative commands have been refused.

If the analysis process 222 determines processing of speculative commands should be performed, the serial processing function 224 may become involved when a speculative command relies on a result from a previously executed command. Continuing with the example of above, a file-open for read command may return a file handle. The subsequent speculative commands may also include directives associated with their processing. For example, if the file is less than 20 Kbytes, obtain the attributes and read the file. The serial processing function 224 may evaluate the file size against the directive, using the file handle obtained from the primary command, the file-open for read command. If the file is small enough, the file-read attributes command may be executed next. The file-read attributes command will, in most cases, return information about creation time and size etc. The serial processing function 224 may use the file handle from the primary request and supply it to the file read command for processing. When the results for all three commands are available, they may be returned to the redirector 202. By performing the primary and two speculative commands entirely at the service process 204, three potential round trips over the network 206 may be reduced to one round trip.

Figure 3:
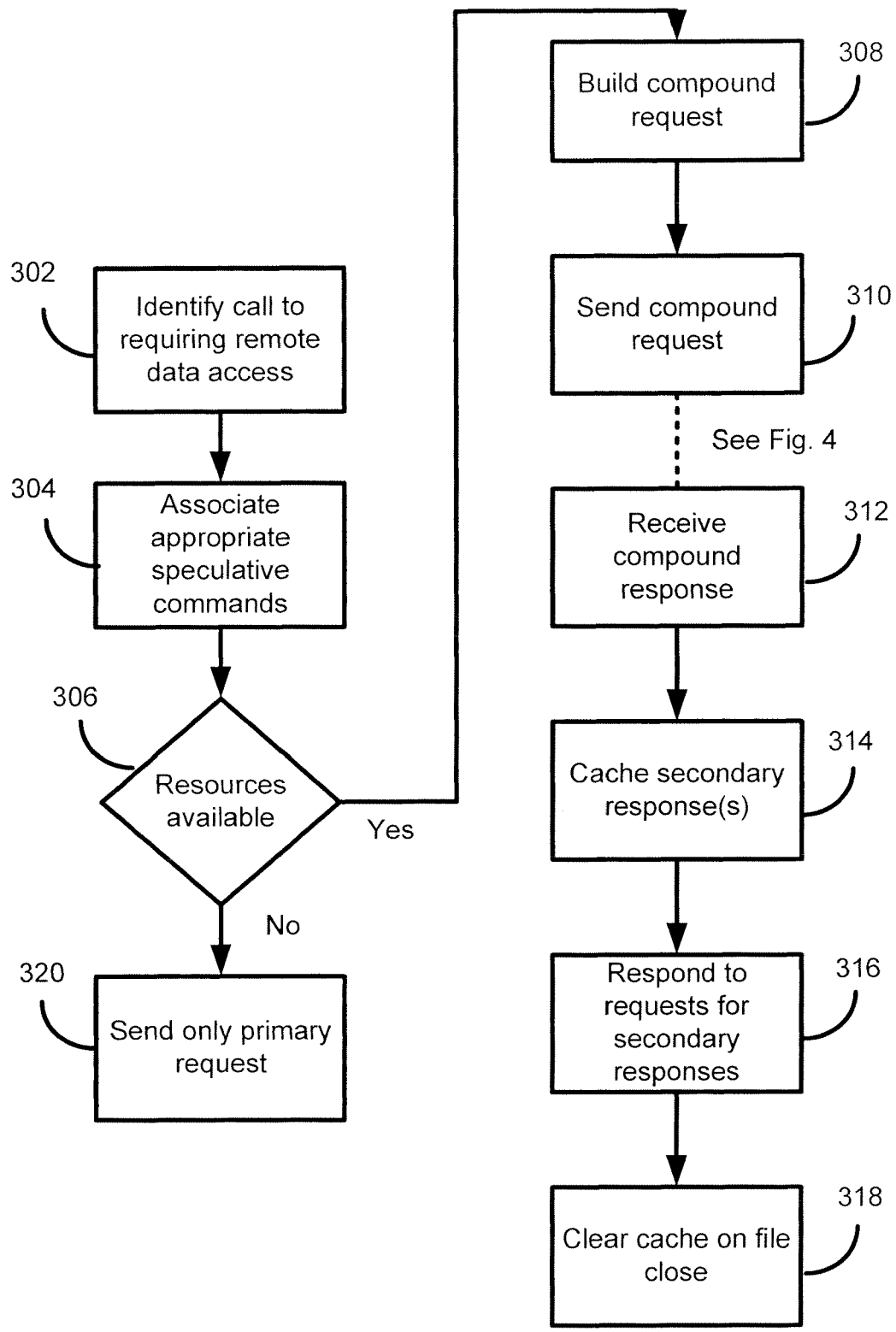
FIG. 3 is a method of initiating and using selective pre-fetching using compound operations.

FIG. 3, a method of initiating and using selective pre-fetching using compound operations is discussed and described. At block 302, an application, such as application 210 of FIG. 2, may identify that a call requiring access to data not available locally. The call may be a remote procedure call (RPC), a SQL database call, or similar process known in the industry. The call may be to a process hosted on the same machine or processor, or may be to a process hosted on a separate machine accessible through a network, such as network 206. While beneficial in both cases, a greater benefit may be realized when network latency is high or unpredictable. As discussed below, predicted network latency may be factored into a decision to process speculative commands or not. In one embodiment, only calls associated with reading data are used for building compound requests.

The call may be passed to an input/output process and ultimately to a RDR or similar process, such as redirector 202. At block 304, a compound request, that is, a request having more than one command, may be built at the redirector 202 using a heuristic to predict the most likely commands to follow an initial command. The heuristic may use a combination of techniques to determine the next step, for example a combination of pre-programmed likely next commands as well as a compilation of actual sequences of commands issued by the current application. The heuristic may also incorporate an evaluation of available resources for storing any results associated with speculative requests, as depicted at block 306. When resources are available, the 'yes' branch from block 306 may be taken to block 308 where the compound request may be generated. At block 310, the compound request may be sent to the receiving process, for example, the service process 204.

Processing at the service process 204 or other recipient of the compound request is discussed below with respect to FIG. 4.

When results from the service process 204 are returned at block 312, if they include a compound response, that is, results from more than one operation, the results from the primary request may be transmitted to the requesting application 210 and the responses to any secondary, speculative, commands may be cached at block 314. At block 316, a request from the application 210 may be compared to a previously filled speculative command. If cached results exist, the results may be supplied to the requesting application 210 without generating a request to the server 216. At block 318, when a file associated with the current request sequence is closed, the cache may be cleared and made available for other speculative requests.

If, at block 306, resources are not available to manage expected results from a speculative request, only the primary request may be sent to the service process 204. That is, speculative commands may not be included because if resources are not available to store the results, they would be discarded and any subsequent request for the same data would have to be resent. However, in a different embodiment, where network latency is extreme, speculative commands may be included anyway, when it can be anticipated that resources may become available during the fulfillment cycle. To fine tune the process of determining when to send a speculative command as part of a compound request, a determination of transit time vs. overall latency may be used. Overall latency may include queue time accessing the network, network transit time (e.g. transmission data rates), and server response times. For example, if queue time accessing the network is long, but the time required to actually transmit the data is short (i.e. fast data rate such as fiber optic connection), it may be worth sending the compound request in anticipation of cache becoming available. However, if transit time is long (e.g. a telephone baseband connection), there may be little point in such a speculative request, even in the case when cache and other resources are available, because transmission of any speculative data may cause such a delay that it may be better to request data only after an explicit request. Alternatively, there may be a situation where conditional processing of a speculative command would still be useful. To illustrate, the redirector 202 may request that a speculative command returns results only if less than a threshold size, for example, 10 Kbytes of data. To summarize, conditional speculative commands may be useful for tuning responses based on both local resources and network characteristics.

Figure 4:
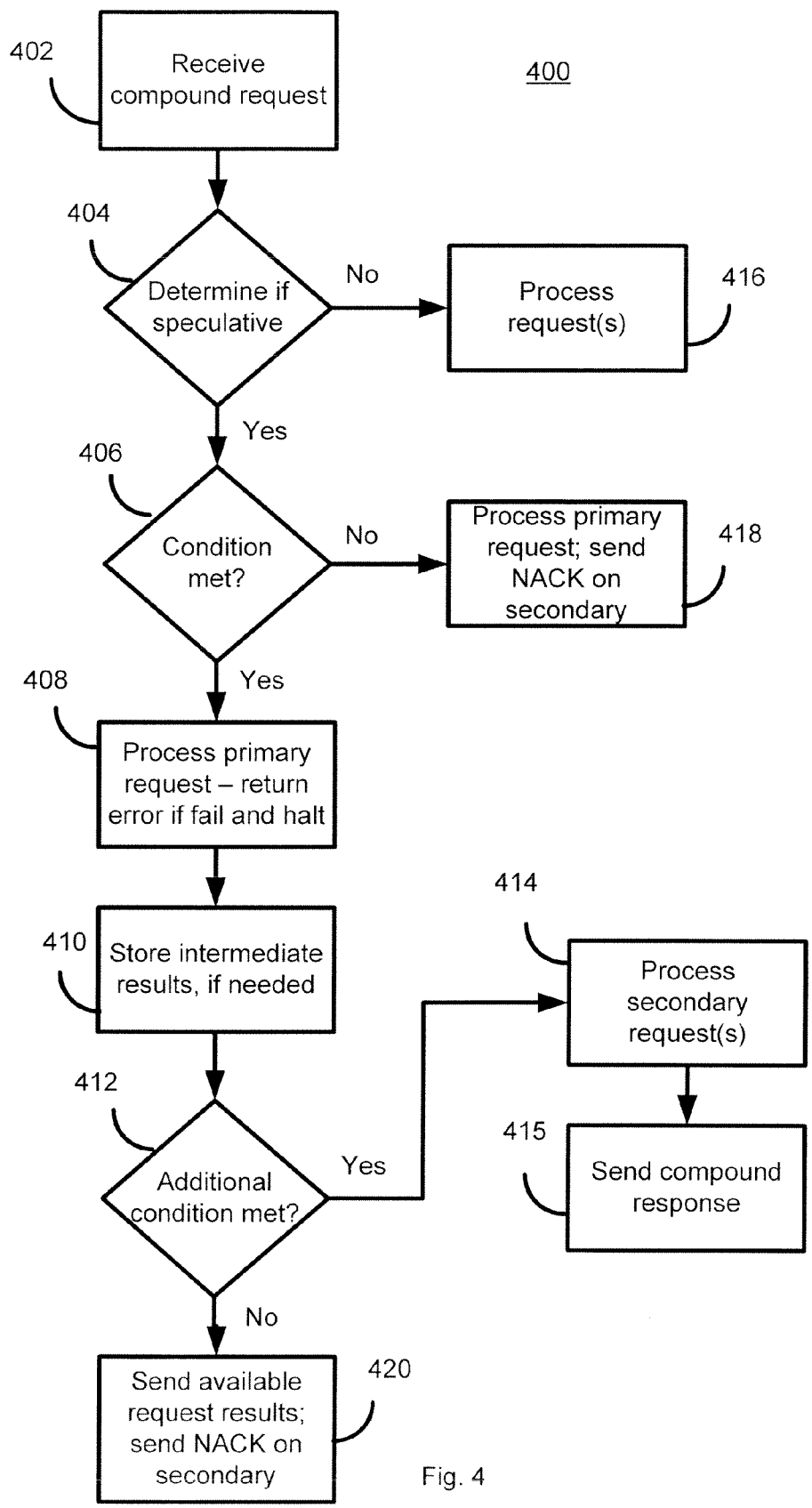
FIG. 4 is a method of processing selective pre-fetch requests.

FIG. 4 is a method 400 of processing selective pre-fetch requests. At block 402, a receiving process, such as service process 204, may receive a compound request from a sender, such as, redirector 204. At block 404, the service process 200 for may determine if the compound request includes speculative commands. If no speculative commands are present, the no branch from block 404 may be followed to block 416 and each command in the compound request may be processed. Similarly, a simple request, having only one command may be processed at block 416 directly. If, at block 404, one or more commands are determined to be speculative, that is, having a flag or other indicator noting that the command may be optionally performed, processing may proceed to block 406. A test at block 406 may determine when a first condition is met for processing the speculative command or commands. The first condition may include determining whether sufficient resources are available to process and store the speculative commands from the compound request. If sufficient resources are not available, for example, data processing queue times exceed an allowable limit or insufficient memory is available to locally store speculative command results, processing may continue at block 418. At block 418, the primary command may be processed and results returned with an indication that speculative commands were not processed.

If it is determined at block 406 that resources are available to process speculative commands, the yes branch from block 406 may be followed to block 408 where the primary request may be processed. Should the primary request fail for any reason, an error may returned according to standard error handling procedures. Since, in virtually all cases, subsequent speculative commands are related to the primary request, there is usually no point in proceeding further and the speculative commands may be abandoned. At block 410, results from the primary (non-speculative) command may be stored pending the outcome of subsequent speculative commands. At block 412, the first of the speculative commands may be processed. Block 412 may support additional conditional testing. For example, the speculative request may have included instructions related to results from the primary command or one or more of the secondary, speculative, commands. For example, as mentioned above, a speculative file read command may be executed only when the file is smaller than the size specified in the speculative request. In another example, a combination of file size and network latency may be evaluated before determining whether to continue with speculative command processing. When the conditions at block 412 are met, the 'yes' branch may be followed to block 414 and the secondary, speculative command processed. When results from the primary command or a preceding speculative command are required as input, such as a file handle, the data may be retrieved from memory and used to build the pending speculative command before being submitted for processing.

At block 415, primary command results and any speculative secondary command results may be formulated into a compound response and sent to the requesting party, for example, redirector 202.

If, at block 412, the additional conditions are not met, the 'no' branch may be followed to block 420 where the primary command results and any completed secondary command results may be sent to the requesting party.

Figure 5:
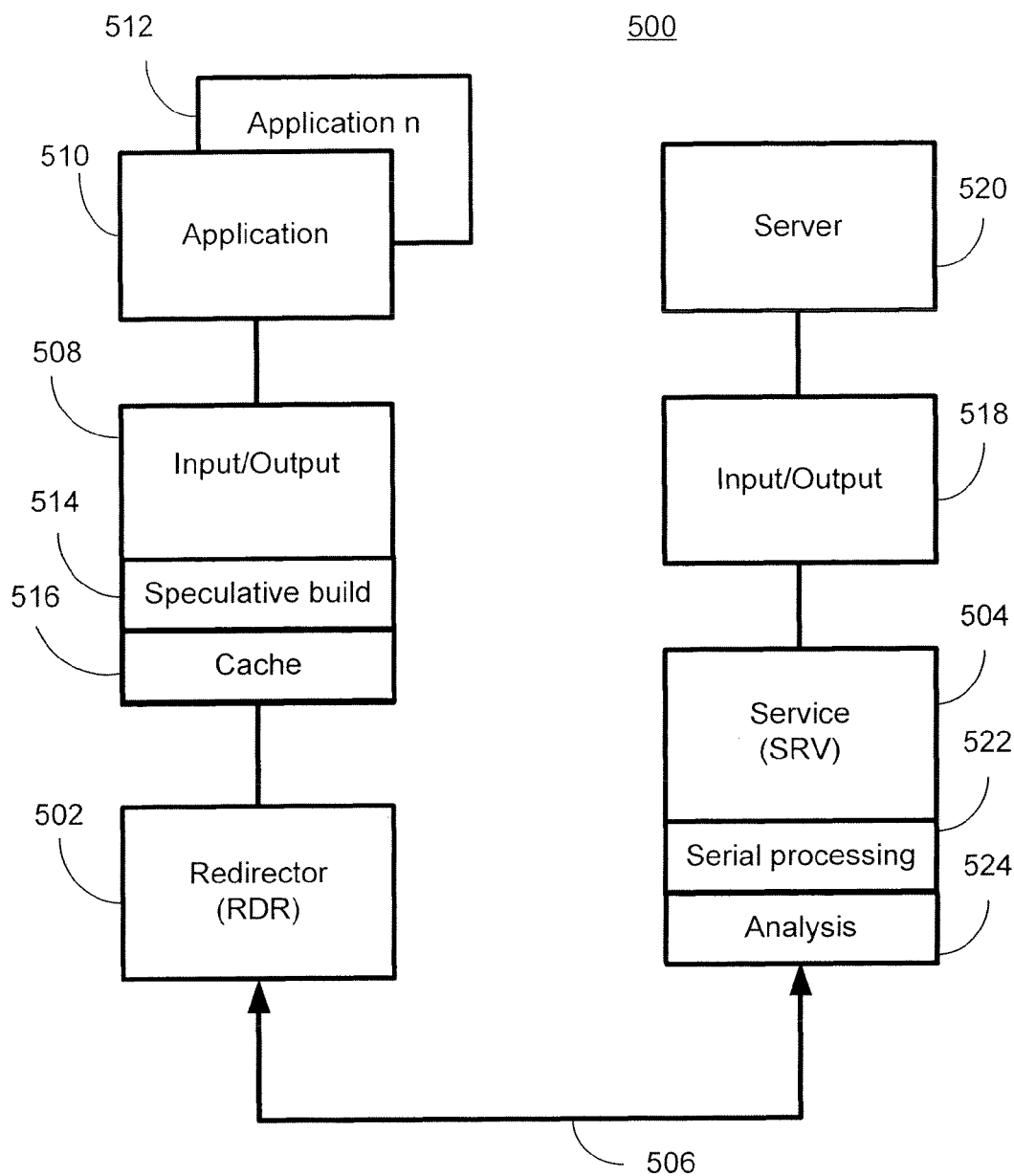
FIG. 5 is a block diagram of alternate logical connections supporting selective pre-fetching.
Figure 6:
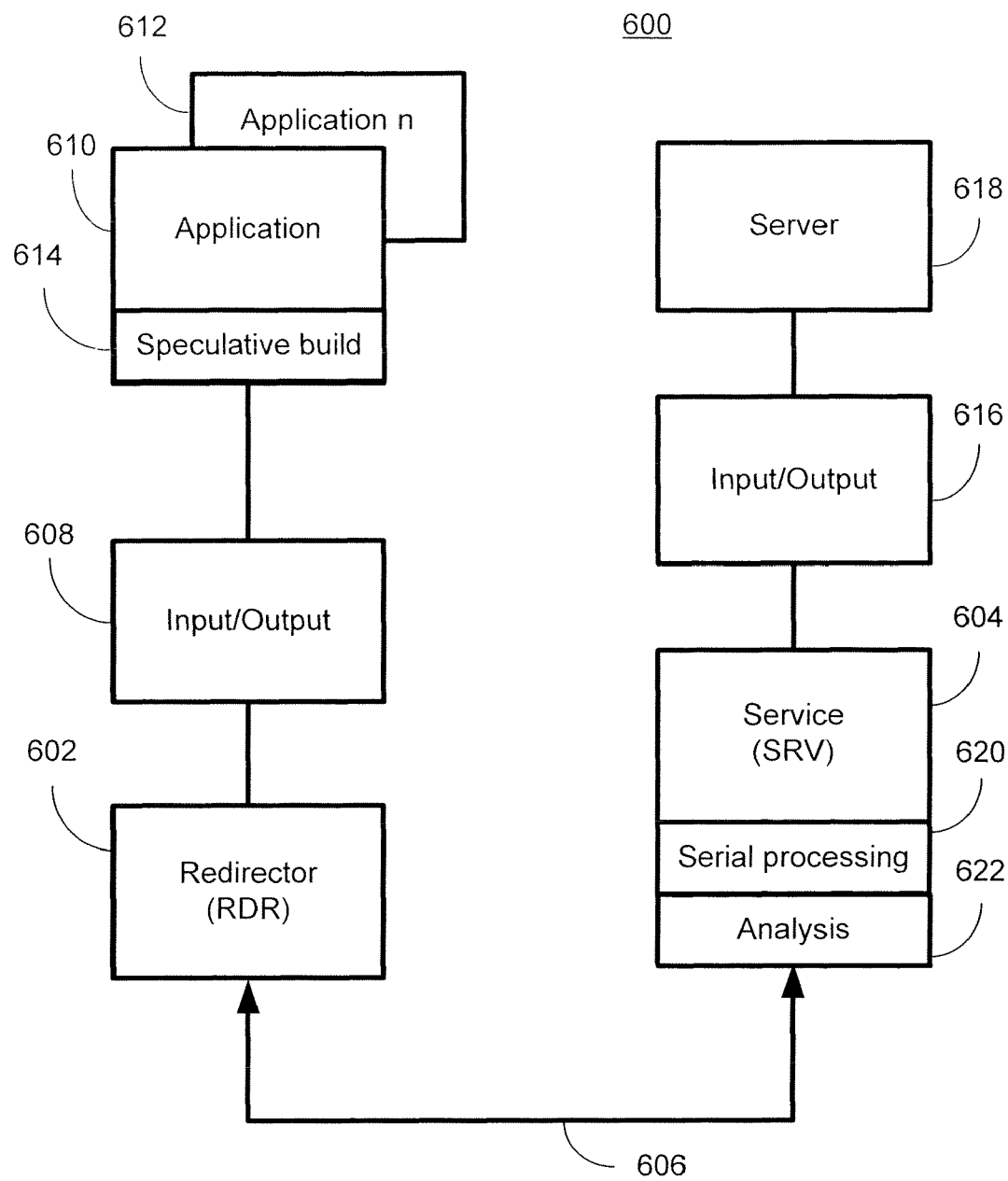
FIG. 6 is a block diagram of additional logical connections supporting selective pre-fetching.

FIG. 5 and FIG. 6 are block diagrams illustrating alternate logical connections supporting selective pre-fetching. FIG. 5 shows the basic elements of the data system of FIG. 2. The redirector 502 is shown coupled to a service process 504 by communication connection 506. Above the redirector 502 is input/output (I/O) function 508 and one or more applications 510 512. In this exemplary embodiment, a speculative build process 514 and a cache function 516 are part of the I/O function 508. By including these functions in the I/O 508 a higher level of abstraction may be possible when building commands, and may result in more resources being available for caching results or may also allow software to be developed with fewer dependencies on lower-level protocols. In this exemplary embodiment, the server-side processes, such as input/output 518 and server 520 are unchanged, and serial processing 522 and analysis 524 remain as part of the service processing 504, but they are not constrained to be a part of the service process 504. In some embodiments, the redirector 502 may still build the actual compound request and receive directives from the higher layer processes to appropriately mark those commands that are to be treated as speculative.

Similarly, FIG. 6 illustrates an embodiment with the redirector 602 coupled to a service process 604 via network 606. Above the redirector 602, are I/O function 608 and one or more applications 610 612. In this example, a speculative build function 614 is shown incorporated into application 610. Because the application 610 has better knowledge of likely next commands and lower-level processes, building speculative data requests at this level may be more efficient than processing speculative commands at lower levels. Also, an application may be more likely to have processing resources, such as memory for cache, readily available. As in many cases, however, a certain level of abstraction may be lost by formulating speculative builds at the application level. A hybrid implementation may be effective in resolving this issue by having a speculative build function 614 as an abstraction in communication with a lower-level, implementation specific speculative build function, such as function 218 of FIG. 2.

In the illustration of FIG. 6, the server-side remains as depicted above, with an input output function 616 above the service process 604 and a server 618 above the I/O function 616. The serial processing function 620 and analysis function 622 are again shown as part of the service 604, but are not required to be implemented at this level.

The system and methods disclosed above bring a new level of sophistication to data retrieval processes by allowing real-time evaluation of a primary data request to determine not only the most appropriate speculative commands to attach to the primary data request, but also by allowing evaluation of whether the speculative command should be sent at all. The ability to attach conditional requirements, such as return file size, to a speculative command gives developers a new level of control for managing system performance. Corresponding server-side processes that allow evaluation of current conditions before processing speculative commands and the use of intermediate results in building subsequent data request commands allow further fine tuning of overall system performance, to the benefit of both system managers and users. Compared to SMB 1.0 implementations, the above system and methods allow both selective pre-fetching and compounding of arbitrary commands. Additionally, no capability existed in SMB 1.0 to provide the logic necessary to pass results between compounded operations on the server side.

We claim:

1. In a computer data processing environment having at least one processor executing a reader process and a service process, the reader process communicatively coupled to the service process, a method of reducing network traffic between the reader and service processes comprising:

receiving a compound request at the service process comprising a first command for a primary operation and a second command for a speculative secondary operation likely to be requested by the reader process following the first command for the primary operation, the second command having a flag indicating that the second command is speculative;

determining that the second command for the speculative secondary operation is speculative based on the flag indicating that the second command is speculative;

in response to a determination that a condition associated with executing the speculative secondary operation is not satisfied, performing the primary operation and secondary operation was not processed; and in response to a determination that the condition associated with executing the speculative secondary operation is satisfied;

performing the primary operation;

performing the speculative secondary operation; and sending the results of the primary operation and the speculative secondary operation.

2. The method of claim 1, further comprising storing the results of the speculative secondary operation at the reader process in a cache memory.

3. The method of claim 2, further comprising clearing the cache memory when a file associated with the speculative secondary operation is closed.

4. The method of claim 1, further comprising determining whether an additional condition associated with executing the speculative secondary operation is satisfied, wherein the additional condition is a size of a result returned from processing the primary operation.

5. The method of claim 1, wherein the condition is an availability of processing resources at the service process.

6. The method of claim 1, further comprising determining whether an additional condition associated with executing the speculative secondary operation is satisfied, wherein the additional condition is a result returned by the primary operation.

7. The method of claim 1, further comprising building the compound request at the reader process using a heuristic to predict the speculative secondary operation based on the primary operation.

8. The method of claim 7, wherein building the compound request at the reader process comprises building the compound request after evaluating that sufficient cache and processing resources are available to manage a response to the compound request.

9. The method of claim 1, further comprising building the compound request at an input/output operation above the reader process.

10. The method of claim 1, further comprising building the compound request at an application above the reader process.

11. The method of claim 1, wherein the second command comprises a plurality of speculative secondary operations.

12. The method of claim 1, wherein the speculative secondary operation is an operation for reading data.

13. A computer-readable storage media device having computer-executable instructions for implementing a method comprising:
   examining a first command requiring a primary operation on a server;
   determining that a second command for a secondary operation is related to the first command for the primary operation;
   comparing the second command to a previously filled speculative command to determine whether results that correspond to the second command are cached;
   responsive to determining that results that correspond to the second command are not cached, attaching the second command for the secondary operation to the first command and marking the second command for the secondary operation speculative, wherein the marking comprises a flag indicating that the second command is speculative;
   sending the first command requiring the primary operation and the second command for the secondary operation to the server;
   receiving results from the primary operation and the secondary operation when conditions associated with performing the second operation are satisfied, wherein at least one of the conditions is satisfied prior to performance of the primary operation;
   caching the results of the secondary operation; and
   supplying the results of secondary operation responsive to comparing a third command to the second command and determining that results that correspond to the third command are cached.

14. The computer-readable storage media device of claim 13, further comprising determining that resources are available for caching the results of the secondary operation before attaching the second command for the secondary operation to the first command.

15. The computer-readable storage media device of claim 13, wherein attaching the second command for the secondary operation to the first command is performed at a reader service.

16. The computer-readable storage media device of claim 13, wherein attaching the second command for the secondary operation to the first command is performed at an input/output service.

17. The computer-readable storage media device of claim 13, wherein attaching the second command for the secondary operation to the first command is performed at an application.

18. A computer-readable storage media device having computer-executable instructions for implementing a method comprising:
   receiving a compound request having a primary operation and a secondary operation, the secondary operation dependent upon a result from the primary operation and having a flag indicating that the secondary operation is speculative;
   in response to a determination that a condition associated with executing the secondary operation is not satisfied, performing the primary operation, receiving a first result corresponding to the primary operation, and responding to the compound request with the first result and an indication that the secondary operation was not performed;
   in response to a determination that the condition associated with executing the secondary operation is satisfied;
   performing the primary operation;
   receiving the first result corresponding to the primary operation;
   extracting data from the first result;
   inserting the data from the first result into the secondary operation;
   receiving a second result corresponding to the secondary operation; and
   responding to the compound request with the first result and the second result.

19. The computer-readable storage media device of claim 18, further comprising determining whether resources are available to process the secondary operation before accepting the secondary operation.

20. The computer-readable storage media device of claim 19, further comprising sending a notification to a calling party that the secondary operation is not accepted when the determining indicates resources are not available to process the secondary operation.

* * * * *